(12) United States Patent
Freudigmann et al.

(10) Patent No.: US 12,408,652 B2
(45) Date of Patent: Sep. 9, 2025

(54) METHOD AND DEVICE FOR DISPENSING AT LEAST ONE LIQUID MEDIUM WITH THE AID OF A SPRAY NOZZLE UNIT, AND COMPUTER PROGRAM PRODUCT

(71) Applicant: Robert Bosch GmbH, Stuttgart (DE)

(72) Inventors: Hans-Arndt Freudigmann, Tuebingen (DE); Johanna Link-Dolezal, Denkendorf (DE); Philip Nagel, Backnang (DE); Tillmann Falck, Munich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 105 days.

(21) Appl. No.: 17/915,328

(22) PCT Filed: Apr. 19, 2021

(86) PCT No.: PCT/DE2021/100356
§ 371 (c)(1),
(2) Date: Sep. 28, 2022

(87) PCT Pub. No.: WO2021/213588
PCT Pub. Date: Oct. 28, 2021

(65) Prior Publication Data
US 2023/0141803 A1 May 11, 2023

(30) Foreign Application Priority Data
Apr. 22, 2020 (DE) .................. 10 2020 205 079.1

(51) Int. Cl.
*A01M 21/04* (2006.01)

(52) U.S. Cl.
CPC .................. *A01M 21/04* (2013.01)

(58) Field of Classification Search
None
See application file for complete search history.

(56) References Cited

U.S. PATENT DOCUMENTS

| | | | |
|---|---|---|---|
| 2004/0030468 A1* | 2/2004 | Britton | A01M 7/0089 701/21 |
| 2009/0226036 A1* | 9/2009 | Gaal | A01M 7/0089 382/103 |

(Continued)

FOREIGN PATENT DOCUMENTS

| | | |
|---|---|---|
| CN | 107846848 A | 3/2018 |
| DE | 102014226189 B4 | 8/2017 |

(Continued)

OTHER PUBLICATIONS

International Search Report for PCT/DE2021/100356, Issued Sep. 15, 2021.

*Primary Examiner* — Katelyn T Truong
(74) *Attorney, Agent, or Firm* — NORTON ROSE FULBRIGHT US LLP

(57) ABSTRACT

A method for dispensing at least one liquid medium with the aid of a spray nozzle unit, in particular for agricultural purposes. The spray nozzle unit includes at least one spray nozzle via which the medium is dispensed, and at least one sensor device via which a biomass, in particular weeds, is/are recognized. With knowledge of the location of the biomass, the at least one spray nozzle is activated in order to dispense the medium onto the biomass.

15 Claims, 3 Drawing Sheets

(56) References Cited

U.S. PATENT DOCUMENTS

| | | | | |
|---|---|---|---|---|
| 2010/0032492 | A1* | 2/2010 | Grimm | A01M 7/0089 |
| | | | | 239/76 |
| 2016/0368011 | A1* | 12/2016 | Feldhaus | B05B 12/124 |
| 2017/0071188 | A1* | 3/2017 | Rees | A01M 7/0089 |
| 2017/0223947 | A1 | 8/2017 | Gall et al. | |
| 2018/0317372 | A1* | 11/2018 | Schleicher | A01B 79/005 |
| 2018/0330166 | A1* | 11/2018 | Redden | G06T 7/75 |
| 2019/0124826 | A1* | 5/2019 | Pickett | A01C 23/02 |
| 2019/0174739 | A1* | 6/2019 | Peters | A01N 25/00 |
| 2019/0191617 | A1* | 6/2019 | Hoffmann | A01N 25/00 |
| 2019/0208762 | A1* | 7/2019 | Schäfer | A01M 7/0089 |
| 2020/0170236 | A1* | 6/2020 | Freudigmann | A01M 7/0085 |
| 2020/0229421 | A1* | 7/2020 | Baβeld et al. | G06V 20/56 |
| 2021/0149406 | A1* | 5/2021 | Javault | A01C 21/005 |

FOREIGN PATENT DOCUMENTS

| | | |
|---|---|---|
| DE | 102017124934 A1 | 4/2019 |
| EP | 3357332 A1 | 8/2018 |
| WO | 2019091790 A1 | 5/2019 |
| WO | 2019094266 A1 | 5/2019 |

* cited by examiner

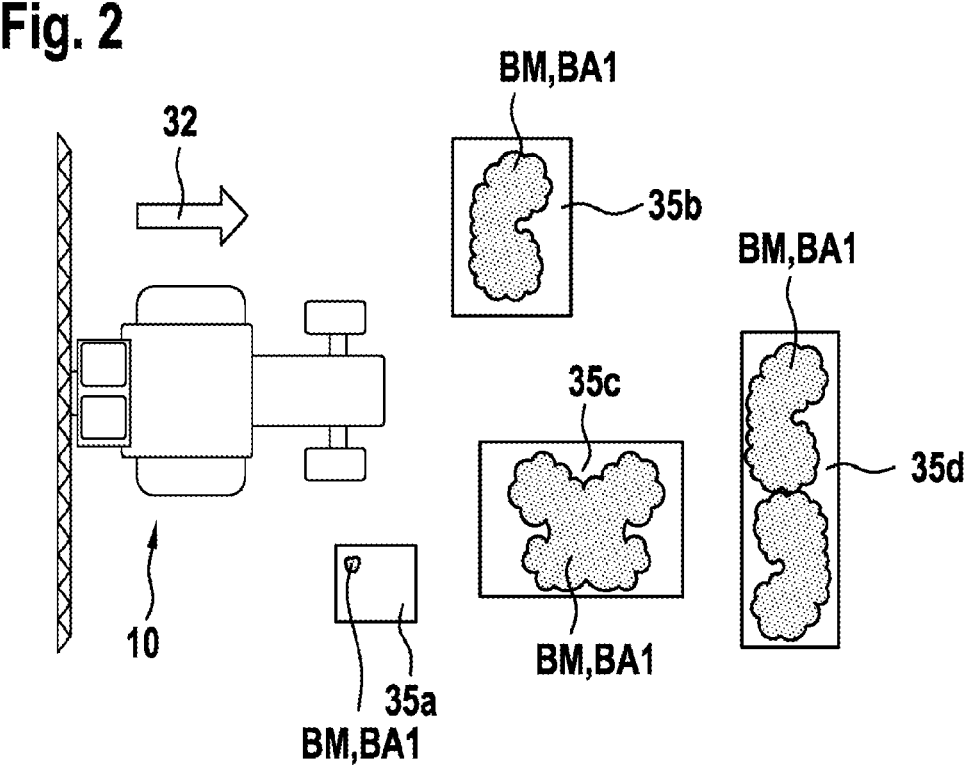
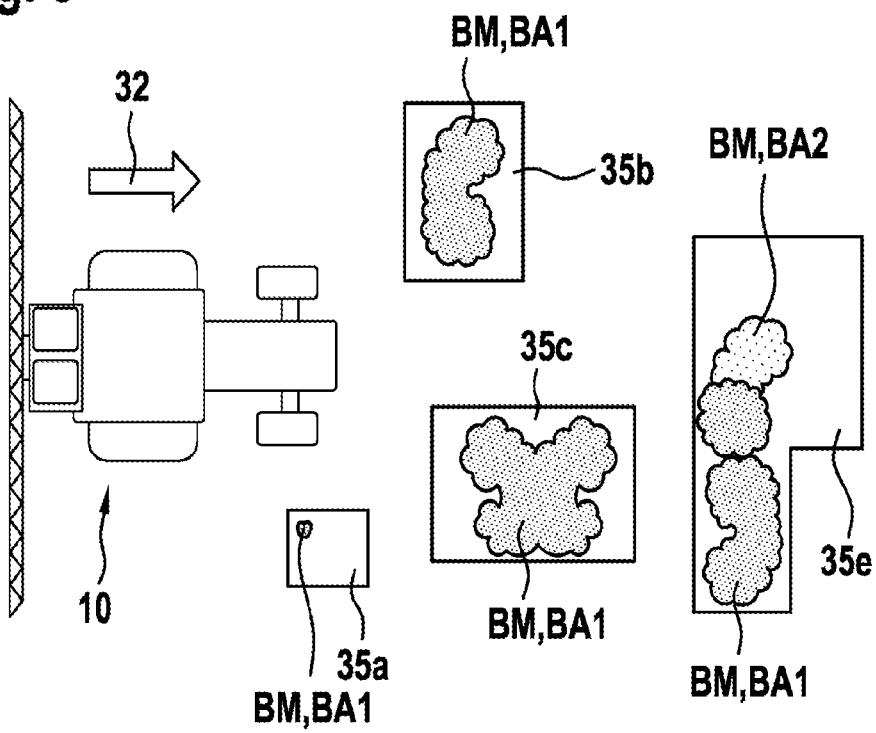

METHOD AND DEVICE FOR DISPENSING AT LEAST ONE LIQUID MEDIUM WITH THE AID OF A SPRAY NOZZLE UNIT, AND COMPUTER PROGRAM PRODUCT

FIELD

The present invention relates to a method and a device for dispensing at least one liquid medium with the aid of a spray nozzle unit, in particular in conjunction with weed control for agricultural areas. Moreover, the present invention relates to a computer program product for carrying out the method according to the present invention or as an integral part of a device according to the present invention.

BACKGROUND INFORMATION

A method for dispensing at least one liquid medium with the aid of a spray nozzle unit is described in German Patent Application No. DE 10 2017 124 934 A1. For example, during travel across an agricultural area, the presence of weeds or biomass in the area is detected with the aid of an optical sensor device, in particular with the aid of a camera. Based on the recognition of the spatial extent of the biomass, for example a spray nozzle of a spray nozzle unit, which is situated at a boom of a tractor or the like, is then activated in such a way that weed killer, for example, is sprayed or dispensed to the greatest extent possible solely in the area of the biomass. This takes place on the one hand against the background of the most sparing use possible of the weed killer or the medium, and on the other hand against the background of the lowest possible pollution load from the medium outside the area to be treated.

SUMMARY

A method according to the present invention for dispensing at least one liquid medium with the aid of a spray nozzle unit, having the features of the present invention, may have an advantage that it allows optimized metering of the at least one medium with regard to the species of the biomass. According to the present invention, in order to achieve an effect that is optimized for the biomass, the target area or the area onto which the at least one medium must be dispensed is not necessarily limited to the spatial extent of the biomass that is detected by the at least one sensor device. In particular, the propagation mechanism of the biological species of a weed determines how the area to be treated must be optimally selected in order to not only effectuate elimination of the recognized weed, but also to prevent or minimize its further propagation. In particular, two propagation mechanisms exist for weeds: propagation or proliferation based on seeds, and based on the roots of the weed or of the biomass.

Against the background of the above discussion, the teaching according to the present invention for metering the at least one liquid medium with the aid of a spray nozzle unit therefore provides that, in addition to the location of the biomass, the biological species of the biomass is also recognized with the aid of an evaluation device that includes an algorithm and is connected to the at least one sensor device, and that the shape of a target area, in the region of which the at least one medium is dispensed or metered, is adapted to the recognized biological species of the biomass as a function of the propagation mechanism. Within the scope of the present invention, the term "shape" encompasses the general configuration, i.e., the external form, as well as the extent, i.e., size, of the target area.

Advantageous refinements of the method according to the present invention for dispensing at least one liquid medium with the aid of a spray nozzle unit are disclosed herein.

With regard to the above statements concerning the different propagation mechanisms of biomass, in particular weeds, in one preferred embodiment of the method according to the present invention provides that the target area surrounds the biomass at a distance from same, and in particular has a rectangular design. In other words, this means that the at least one medium is additionally dispensed outside the recognized spatial extent of the biomass. The area onto which the at least one medium is dispensed or metered depends not only on the recognized species of the biomass, but of course also on the recognized size of the area on which the biomass is situated. Thus, for example, for a relatively small area of the recognized biomass, typically a relatively small overall surface area onto which the at least one medium must be dispensed is likewise necessary. For a spatially extended or larger area on which the biomass has been located, typically a larger area outside the recognized biomass, in whose region the at least one medium must be dispensed, also results.

A further preferred embodiment of the method according to the present invention provides that the type of medium is selected as a function of the recognized biological species of the biomass. Such a variation in the method on the one hand includes the option to use different weed killers, depending on the different types of weeds, for example, or on the other hand, with knowledge of the propagation area to carry out additional measures, for example the application of a broadly effective herbicide or soil herbicide. By use of the latter measure, it is also possible to effectively treat weeds that have not yet germinated.

In one refinement of the method, it is also provided that the target areas for the at least two different media are different. However, "different target areas" also includes the case that the two target areas for the different media at least partially overlap or cover one another.

A further optimized effect of the method according to the present invention is achieved when weather effects, in particular also at least the wind direction and wind intensity, at the time of dispensing the at least one medium are taken into account in computing the target area. Such weather or wind effects may be ascertained, for example, in real time using appropriate sensor means at the vehicle dispensing the at least one medium, or based on empirical values from the past.

In addition, the present invention includes an evaluation device that is configured to recognize a location of a biomass, in particular weeds, and a biological species of the biomass, the biomass being recognized with the aid of at least one sensor device of a spray nozzle unit that includes at least one spray nozzle for dispensing a liquid medium, in particular for agricultural purposes, and to activate the spray nozzle unit in such a way that a shape of a target area, in whose region the at least one medium is or is to be dispensed, is adapted to the recognized biological species of the biomass as a function of the propagation mechanism.

Moreover, the present invention also includes a device for dispensing at least one liquid medium with the aid of a spray nozzle unit, in particular for agricultural purposes, the spray nozzle unit including at least one spray nozzle and an evaluation device that includes an algorithm for at least indirectly activating the spray nozzle, and at least one sensor device for recognizing the biological species of a biomass, the algorithm being designed to carry out the described method according to the present invention.

In one preferred embodiment or refinement of such a device according to the present invention, it is provided that the sensor device is designed as an optical device, in particular as a camera device.

Furthermore, one preferred example embodiment of the device according to the present invention provides that the spray nozzle unit is coupled to different storage containers in which different media are storable.

The present invention also includes a computer program product, in particular in the form of a data medium, that is designed to carry out the method according to the present invention or that is used as an integral part of a device according to the present invention.

Further advantages, features, and particulars of the present invention result from the following description of preferred specific embodiments of the present invention, and based on the figures.

BRIEF DESCRIPTION OF THE DRAWINGS

FIGS. 2 through 5 each show simplified top views onto different application areas of media when carrying out example methods according to the present invention for dispensing at least one medium onto an agriculturally usable area.

DETAILED DESCRIPTION OF EXAMPLE EMBODIMENTS

Figure 1:
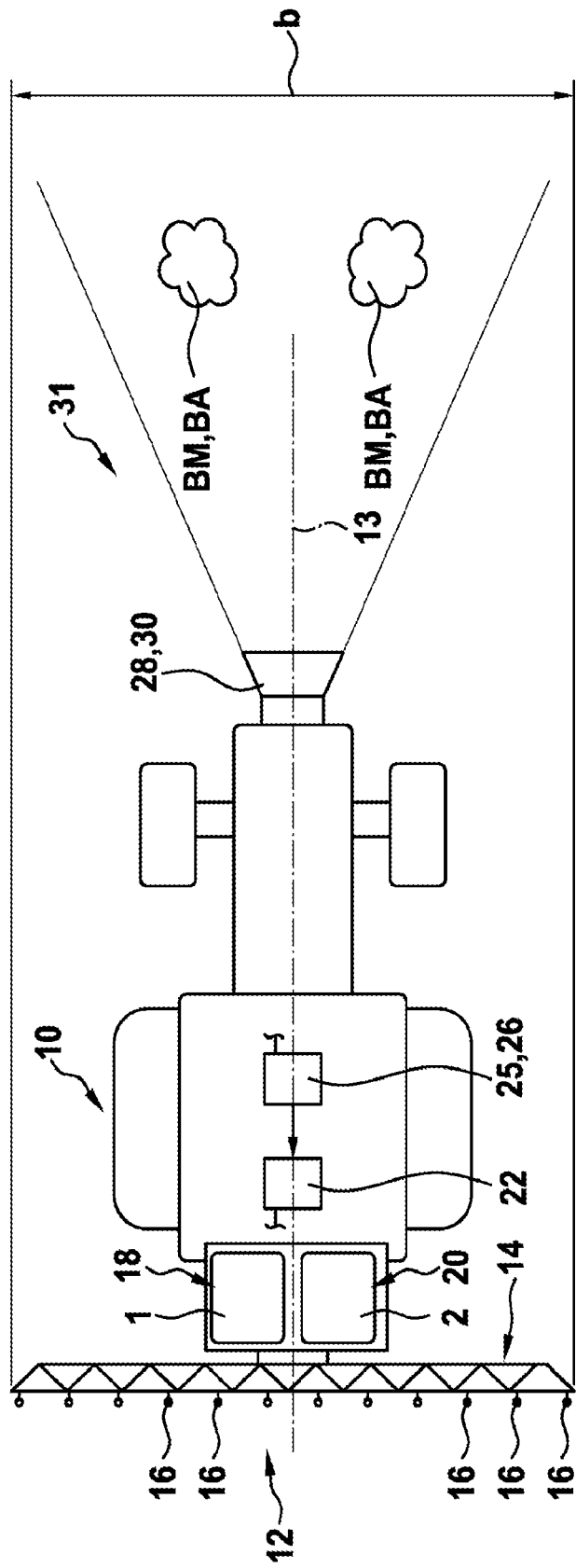
FIG. 1 shows a simplified illustration of an agricultural vehicle that is provided with a spray nozzle unit, according to an example embodiment of the present invention.

Identical elements or elements having an identical function are provided with the same reference numerals in the figures.

FIG. 1 illustrates an agricultural vehicle in the form of a tractor 10 by way of example, at whose rear end a spray nozzle unit 12 is situated. Spray nozzle unit 12 includes a support frame 14, extending transversely with respect to longitudinal axis 13 of tractor 10, at which a plurality of spray nozzles 16 are situated spaced apart from one another. The arrangement or design of spray nozzles 16 is such that when an area is traveled across by tractor 10, a medium 1, 2 that is dispensed via spray nozzles 16 may completely treat the area that is traveled across by support frame 14. As an example but not limited thereto, medium 1, 2 involves different weed killers, growth promoters, herbicides, or the like.

It may also be provided that not just one row, but multiple rows (not illustrated) of spaced-apart spray nozzles 16 are provided in such a way that separate spray nozzles 16 are associated with each of the different media 1, 2. These different spray nozzles 16 may differ, for example, with regard to spray patterns, spray angles, etc., as is known from the related art, to optimize the dispensing of particular medium 1, 2.

For stocking media 1, 2, tractor 10 also includes at least one storage container 18, 20 at its rear area for storing particular medium 1, 2. The activation of spray nozzles 16 takes place with the aid of an activation unit 22, only schematically illustrated, which is designed in particular to activate or open and close valves associated with particular spray nozzles 16. Activation unit 22 is in turn connected to an evaluation device 25 that includes an algorithm 26 in the form of a computer program product.

In addition, tractor 10 includes at least one sensor device 28, preferably in the form of a camera or image recording device 30. Image recording device 30 is situated in the front area of tractor 10, and allows the ground surface situated ahead of tractor 10 to be recorded or detected during travel of tractor 10. In particular, detection range 31 of image recording device 30 is such that it corresponds at least to width b of spray nozzle unit 12 or of support frame 14. As an example, the detected data or images detected by image recording device 30 are supplied to evaluation device 25 as an input variable.

Evaluation device 25 or its algorithm 26 allows the data detected by image recording device 30 to be evaluated as to whether a biomass BM is situated in detection range 31 of image recording device 30. This involves in particular not only a location of biomass BM in detection range 31 of image recording device 30, i.e., for example at which transverse offset and distance from longitudinal axis 13 of tractor 10 biomass BM is situated, but also the option to determine biological species BA of biomass BM. In particular, algorithm 26 allows biological species BA of biomass BM to be analyzed with regard to its proliferation possibilities or propagation paths. This applies in particular to different species of weeds as biological species BA.

It is illustrated in FIG. 2 that tractor 10 is traveling across an agricultural cultivated area in the direction of arrow 32. Image recording device 30 (not illustrated) detects four positions containing a biomass BM, which is identified by algorithm 26 as biological species BA1. In addition, based on the propagation mechanism of biological species BA1, algorithm 26 generates by way of example four rectangular target areas 35a through 35d that are adapted to the propagation of biomass BM and that surround biomass BM at a relatively small distance, for treating with medium 1 or 2 to allow elimination of biological species BA1.

It is illustrated in FIG. 3 that image recording device 30 or algorithm 26, not illustrated, detects a second biological species BA2 or a second type of weed in addition to first biological species BA1. Second biological species BA2 is characterized by a propagation mechanism that is different from first biological species BA1. In particular, due to its propagation mechanism, in addition to target areas 35a through 35c, biological species BA2 requires generation of a target area 35e, which in the region of biological species BA2 is larger than target area 35d corresponding to FIG. 2, and which surrounds biological species BA2 at a greater distance than is the case for biological species BA1.

Figure 4:
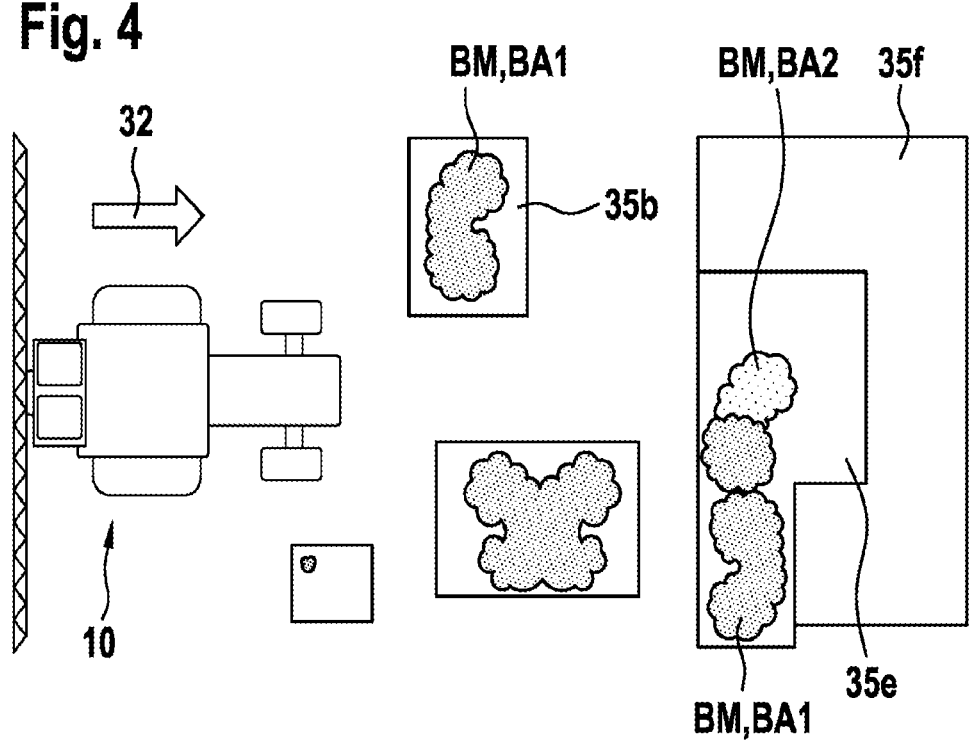

It is illustrated in FIG. 4 that due to recognized biological species BA2, it is additionally provided to generate a target area 35f, illustrated with a border, having a larger extension than target area 35e. A different medium 1, 2 is used within target area 35f than within target area 35e. As an example, different medium 1, 2 is a second herbicide that requires a spatially adapted application window due to biological species BA2.

Figure 5:
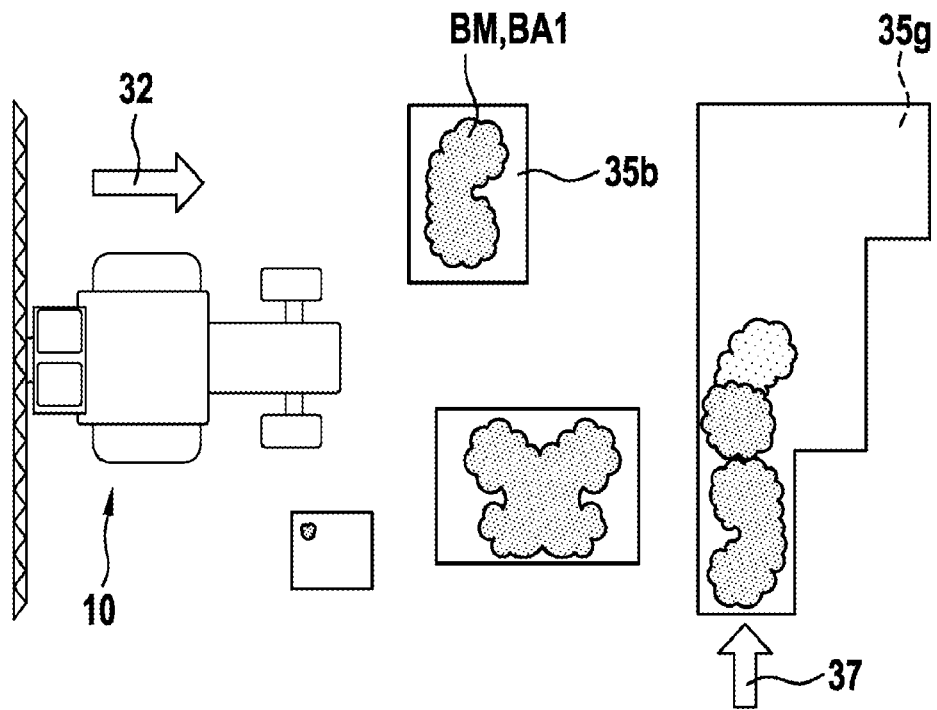

Lastly, a variant of FIG. 3 is illustrated in FIG. 5. It is apparent that a target area 35g has been generated that is larger than target area 35e according to FIG. 3. This follows from biological species BA2 and the wind direction illustrated by arrow 37, which results in an enlarged propagation area of biological species BA2. The wind direction is ascertained either with the aid of a sensor system situated at tractor 10, or based on existing data from the past or preferred wind directions. In addition to the wind direction, the wind intensity is also taken into account, in particular during an instantaneous measurement by a sensor device.

The described method for dispensing at least one liquid medium 1, 2 with the aid of a spray nozzle unit 12 may be varied or modified in many ways without departing from the concept according to the present invention.

What is claimed is:

1. A method for dispensing at least one liquid medium using a spray nozzle unit for agricultural purposes, the spray nozzle unit including at least one spray nozzle via which the medium is dispensed, and at least one sensor device by which weeds are recognized, the method comprising:
   activating the at least one spray nozzle based on a location of the weeds to dispense the medium onto the weeds;
   recognizing a biological species of the weeds using an evaluation device that includes an algorithm;
   determining, based on the recognized biological species, which propagation mechanism of a plurality of different propagation mechanisms, the weeds use to propagate, wherein the plurality of different propagation mechanisms includes: (i) propagation based on seeds and (ii) propagation based on based on roots; and
   adapting a shape of a target area in a region of which the at least one medium is dispensed to the recognized biological species of the weeds as a function of the determined propagation mechanism of the weeds.

2. The method as recited in claim 1, wherein the target area has a rectangular-type shape, which surrounds the weeds at a defined distance and which is defined as the function of the determined propagation mechanism of the weeds.

3. The method as recited in claim 1, wherein the target area surrounds the weeds at a defined distance, and has a rectangular shape.

4. The method as recited in claim 1, wherein a type of the medium is selected as a function of the recognized biological species of the weeds.

5. The method as recited in claim 1, wherein at least two different media are dispensed.

6. The method as recited in claim 5, wherein target areas for dispensing the at least two different media are different.

7. The method as recited in claim 1, wherein weather effects including wind direction and wind intensity, are additionally taken into account in adapting the shape the target area.

8. An evaluation apparatus, comprising:
   a device configured to: recognize a location of weeds, recognize a biological species of the weeds, and determine, based on the recognized biological species, which propagation mechanism of a plurality of different propagation mechanisms, the weeds use to propagate, wherein the plurality of different propagation mechanisms includes: (i) propagation based on seeds, and (ii) propagation based on based on roots, wherein the weeds are sensed with at least one sensor device of a spray nozzle unit that includes at least one spray nozzle for dispensing a liquid medium for agricultural purposes, and configured to activate the spray nozzle unit so that a shape of a target area, in a region of which the at least one medium is dispensed, is adapted to the recognized biological species of the weeds as a function of the determined type of propagation mechanism of the weeds.

9. The evaluation device as recited in claim 8, wherein the target area has a rectangular-type shape, which surrounds the weeds at a defined distance and which is defined as function of the determined propagation mechanism of the weeds.

10. A device for dispensing at least one liquid medium, comprising:
    a spray nozzle unit configured to dispense the medium for agricultural purposes, the spray nozzle unit including at least one spray nozzle;
    an evaluation device, which includes an algorithm, to at least indirectly activate the at least one spray nozzle; and
    at least one sensor device configured to recognize weeds;
    wherein the algorithm is configured to perform the following:
       activate the at least one spray nozzle based on a location of the weeds to dispense the medium onto the weeds;
       recognize a biological species of the weeds;
       determine, based on the recognized biological species, which propagation mechanism of a plurality of different propagation mechanisms, the weeds use to propagate, wherein the plurality of different propagation mechanisms includes: (i) propagation based on seeds and (ii) propagation based on based on roots; and
       adapt a shape of a target area in a region of which the at least one medium is dispensed to the recognized biological species of the weeds as a function of the determined propagation mechanism of the weeds.

11. The device as recited in claim 10, wherein the sensor device is an optical device.

12. The device as recited in claim 10, wherein the spray nozzle unit is coupled to different storage containers in which different media are storable.

13. The device of claim 10, wherein the target area has a rectangular-type shape, which surrounds the weeds at a defined distance and which is defined as the function of the determined propagation mechanism of the weeds.

14. A non-transitory storage medium, on which is stored a computer program, which is executable by a processor, comprising:
    a program code arrangement having program code for dispensing at least one liquid medium using a spray nozzle unit for agricultural purposes, the spray nozzle unit including at least one spray nozzle, via which the medium is dispensed, and at least one sensor device by which weeds are recognized, by performing the following:
       activating the at least one spray nozzle based on a location of the weeds to dispense the medium onto the biomass;
       recognizing a biological species of the biomass using an evaluation device that includes an algorithm;
       determining, based on the recognized biological species, which propagation mechanism of a plurality of different propagation mechanisms, the weeds use to propagate, wherein the plurality of different propagation mechanisms includes: (i) propagation based on seeds and (ii) propagation based on based on roots; and
       adapting a shape of a target area in a region of which the at least one medium is dispensed to the recognized biological species of the weeds as a function of the determined propagation mechanism of the weeds.

15. The non-transitory storage medium of claim 14, wherein the target area has a rectangular-type shape, which surrounds the weeds at a defined distance and which is defined as the function of the determined propagation mechanism of the weeds.

* * * * *